No. 728,542. PATENTED MAY 19, 1903.
P. CECIL.
SCRUBBING MACHINE.
APPLICATION FILED FEB. 9, 1903.
NO MODEL.
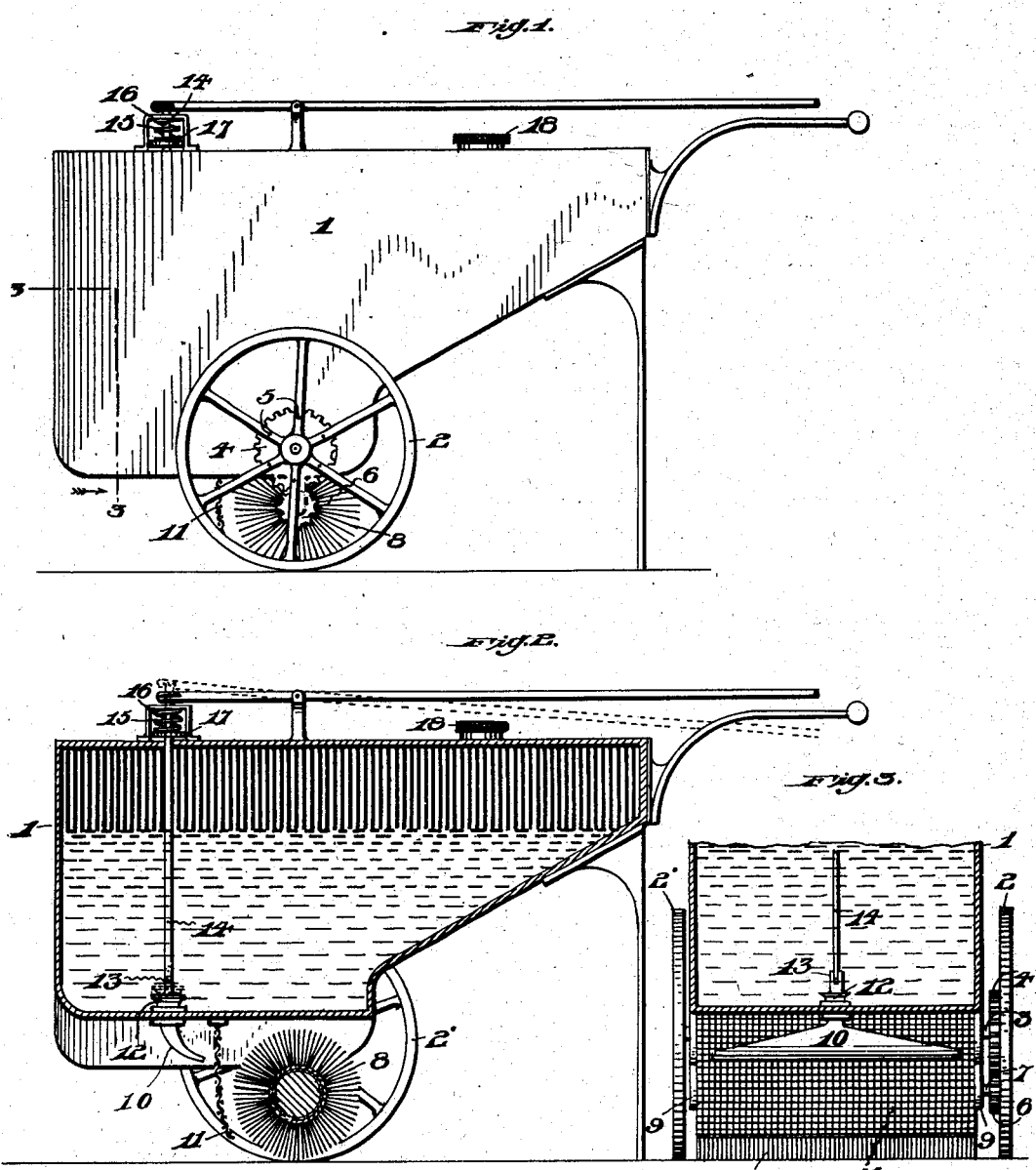

No. 728,542. Patented May 19, 1903.

UNITED STATES PATENT OFFICE.

PRICE CECIL, OF HAZLEWOOD, PENNSYLVANIA.

SCRUBBING-MACHINE.

SPECIFICATION forming part of Letters Patent No. 728,542, dated May 19, 1903.

Application filed February 9, 1903. Serial No. 142,570. (No model.)

*To all whom it may concern:*

Be it known that I, PRICE CECIL, a citizen of the United States of America, residing at Hazlewood, in the county of Allegheny and State of Pennsylvania, have invented certain new and useful Improvements in Scrubbing-Machines, of which the following is a specification.

This invention relates to certain new and useful improvements in scrubbing-machines, and more especially to that type in which a scrubbing-brush is mounted and carried with a water-carrier.

Figure 1 is a side elevation of my improved scrubbing-machine. Fig. 2 is a vertical section thereof. Fig. 3 is a partial cross-section taken on the line 3 3 of Fig. 1.

In the construction illustrated in the drawings I mount the water-receptacle 1 upon wheels 2 and 2', while the axle 3 is made integral with the sides of tank. Secured to the inner face of wheel 2 is a large pinion 4, which is mounted on said wheel and held rigid thereon by the use of screw-pins 5, arranged in spokes of wheel. The master-pinion 4 meshes with a smaller pinion 6, rigidly mounted on shaft 7 of scrubbing-brush 8. The shaft of the scrubber is journaled at each end in a downward-projecting portion 9 of the tank. To evenly distribute the water upon the surface of the bristles as it flows from the fan-shaped nozzle 10, I suspend a wire mesh 11 from the bottom of the tank and in close proximity to the scrubbing-wheel. This will diffuse the water and give a better distribution upon the bristles.

I employ the ordinary ground-seated valve 12, pivoted at 13 on the upright rod 14. This valve is normally kept closed by the tension-spring 15 bearing against the bracket 16. The spring in turn exerts a downward pressure upon washer 17, that is rigid on rod 14, thus seating the valve, and when the same is open it will appear as shown in dotted lines of the drawings. The tank is filled by removing the ordinary screw-cap 18.

I do not wish to limit myself to the exact details of construction and operation herein set forth, as I may make various changes in the same without departing from the spirit of my invention.

Having thus fully described my invention, what I claim as novel, and desire to secure by Letters Patent, is—

In a scrubbing-machine, a tank, a scrubbing-brush rotatable under the tank, a truck on which the tank is mounted, means for driving the brush from the truck-wheels, a spout discharging from the tank on the brush, means for controlling the flow of water to the spout and a wire mesh interposed between the spout and brush.

In testimony whereof I affix my signature, in the presence of two witnesses, this 6th day of February, 1903.

PRICE CECIL.

Witnesses:
 JOHN NOLAND,
 J. P. APPLEMAN.